United States Patent [19]
Tanaka

[11] Patent Number: 4,895,308
[45] Date of Patent: Jan. 23, 1990

[54] FULLY AUTOMATIC COFFEE MAKER

[76] Inventor: Mutuo Tanaka, No. 5-24-19, Sakaecho, Tachikawa-shi, Tokyo, Japan

[21] Appl. No.: 232,860

[22] Filed: Aug. 16, 1988

[30] Foreign Application Priority Data

Jan. 25, 1988 [JP] Japan .................................. 63-14086

[51] Int. Cl.$^4$ ........................... B02C 1/08; B02C 5/02
[52] U.S. Cl. ..................................... 241/65; 241/100; 99/286
[58] Field of Search ...................... 241/65, 100, 101.2; 99/280, 286, 306; 426/433; D7/309

[56] References Cited

U.S. PATENT DOCUMENTS 2,783,149  2/1957  Epstein .............................. 99/286 X
3,153,377 10/1965  Bosah ................................ 99/286 X

FOREIGN PATENT DOCUMENTS 55462    7/1982  European Pat. Off. .............. 99/286
0213645  3/1987  European Pat. Off. .
524657   5/1931  Fed. Rep. of Germany .
1076477  6/1957  Fed. Rep. of Germany .

Primary Examiner—Timothy V. Eley
Attorney, Agent, or Firm—Andrus, Sceales, Starke & Sawall

[57] ABSTRACT

A fully automatic coffee maker comprises a roasting portion which heats raw coffee beans placed therein by heating means so as to roast the raw coffee beans, a grinding portion which grinds the roasted coffee beans which have been roasted in the roasting portion, a transferring portion which is connected between the roasting portion and the grinding portion and automatically transfers the roasted coffee beans from the roasting portion to the grinding portion after the raw coffee beans have been roasted, and an extracting portion which extracts the coffee from the ground coffee beans loaded therein from the grinding portion.

12 Claims, 4 Drawing Sheets

FULLY AUTOMATIC COFFEE MAKER

BACKGROUND OF THE INVENTION

The present invention relates to a fully automatic coffee maker, and particularly relates to a fully automatic coffee maker designed to improve the flavour and aroma of coffee by making the coffee from raw coffee beans by full automation.

As methods of making coffee, the syphon method and the drip method for example are well known. Recently, an automatic coffee maker for automatically making coffee has become known for the various coffee making methods. The conventional automatic coffee maker generally comprises a grinding portion which grinds previously roasted coffee beans placed therein, and an extracting portion which extracts the coffee from the ground coffee beans by a method such as the syphon method and the drip method. Accordingly, to make coffee with the automatic coffee maker, roasted coffee beans which are commonly marketed are bought and are placed in the automatic coffee maker, and by operating the automatic coffee maker it is possible to make the coffee.

In order to further enhance the flavour and aroma of the coffee, it is desirable to grind the roasted coffee beans in a grinder and extract the coffee immediately after the raw coffee beans have been roasted. However, in the conventional automatic coffee maker, it is necessary to buy the roasted coffee beans which are marketed and thereafter make the coffee therefrom. For this reason, with the conventional case there is a problem that the flavour and aroma of the coffee is deteriorated in comparison to the coffee made immediately after roasting the raw coffee beans. Further, the raw coffee beans have a characteristic of being able to be kept for a long time period even under conditions of normal temperature and normal humidity, and on the contrary, the flavour and aroma of the coffee improves while keeping the raw coffee beans. In contrast, the flavour and aroma of the roasted coffee beans deteriorates rapidly, and moreover, the flavour and aroma cannot be preserved unless the roasted coffee beans are kept under conditions of relatively low temperature and no humidity. Therefore, for these reasons, there is a problem that it is difficult to make the coffee having an excellent flavour and aroma in the conventional automatic coffee maker which makes the coffee from the roasted coffee beans.

SUMMARY OF THE INVENTION

Accordingly, a general object of the present invention is to provide a novel and useful fully automatic coffee maker in which the disadvantages of the conventional automatic coffee maker have been eliminated.

A more specific object of the present invention is to provide a fully automatic coffee maker which can make coffee of an excellent flavour and aroma by full automation from raw coffee beans.

Another object of the present invention is to provide a fully automatic coffee maker which roasts raw coffee beans and immediately thereafter grinds the roasted coffee beans and extracts the coffee therefrom.

The above objects and features of the present invention can be achieved by a fully automatic coffee maker comprising a roasting portion which heats raw coffee beans placed therein by heating means so as to roast the raw coffee beans, a grinding portion which grinds the roasted coffee beans roasted in the roasting portion, a transferring portion which is provided between the roasting portion and the grinding portion and automatically transfers the roasted coffee beans to the grinding portion after the raw coffee beans have been roasted in the roasting portion, and an extracting portion which extracts the coffee from the ground coffee beans loaded therein from the grinding portion.

Other objects, features and advantages of the present invention will become apparent from the following detailed description when read in conjunction with the accompanying drawings.

DETAILED DESCRIPTION

A description will be given on an embodiment according to the present invention with reference to FIGS. 1 through 5.

Figure 1:
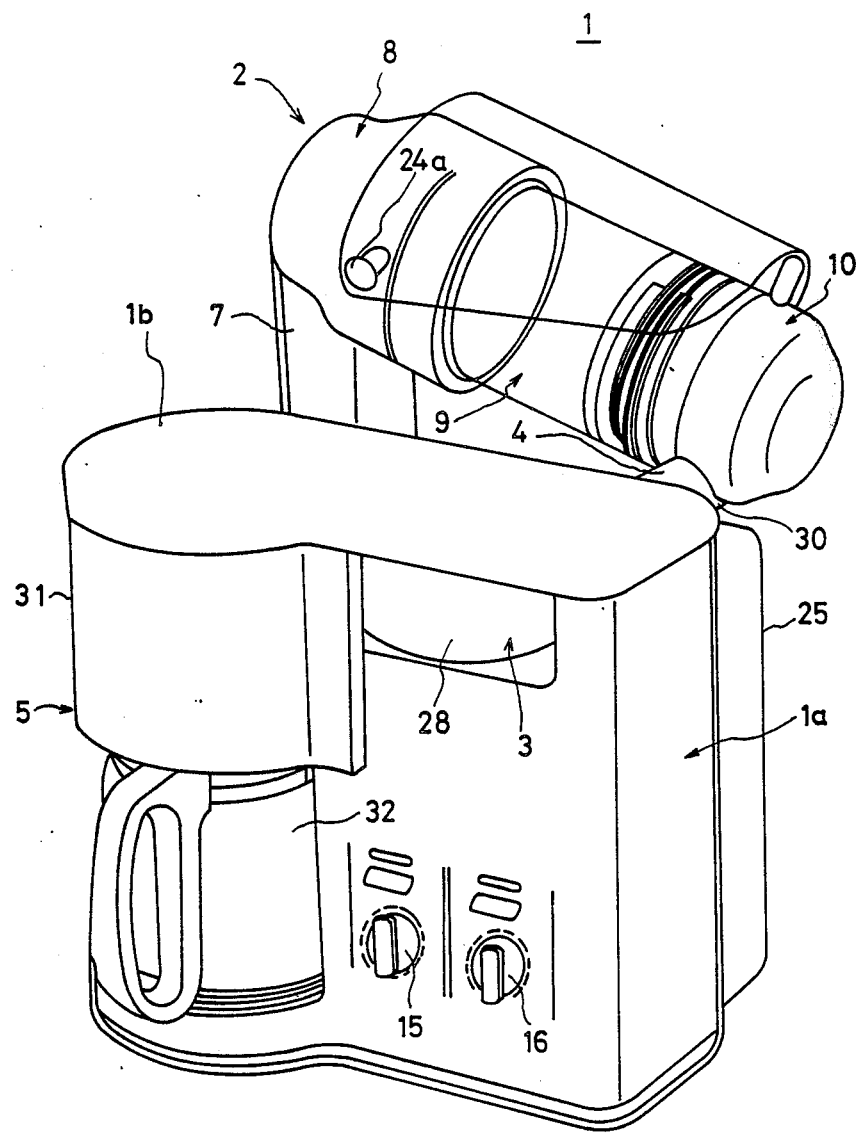
FIG. 1 is an perspective view of a coffee maker which is an embodiment of the present invention.

FIG. 1 is an external view showing a fully automated coffee maker (hereinafter referred to as a coffee maker) 1 which is an embodiment of the present invention. In FIG. 1, the coffee maker 1 employs the drip method, and in general has a construction in which a roasting portion 2, a grinding portion 3, a transfer portion 4, an extracting portion 5 and the like are unitarily provided on a coffee maker body 1a.

Figure 2:
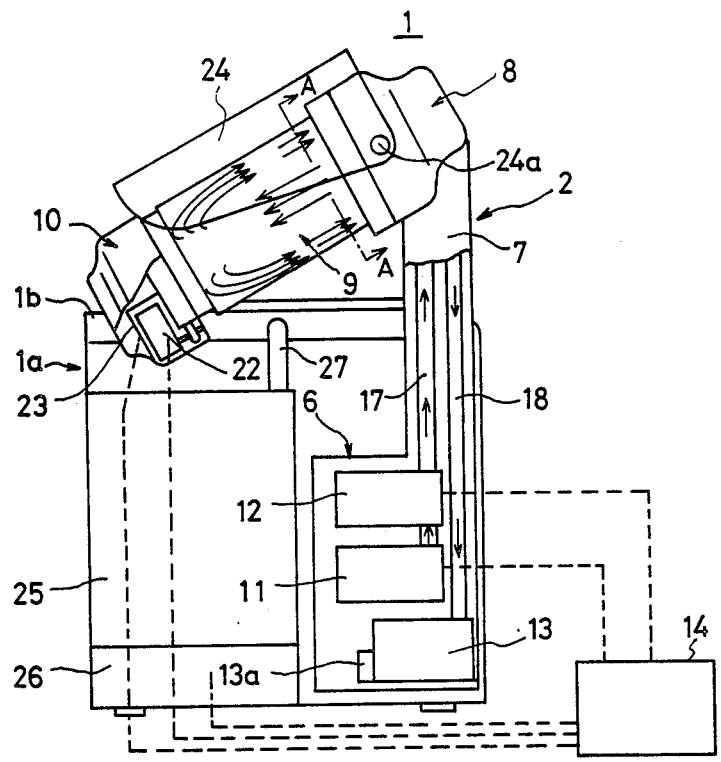
FIG. 2 is a partially sectioned elevational view for describing the roasting portion.

As shown in FIG. 2, the roasting portion 2 comprises a body portion 6, a column 7, a head portion 8, a roasting container 9, a base portion 10 and the like. The body portion 6 is provided in a backwards facing end (right-hand side in FIG. 2) of the coffee maker body 1a. A blower 11, a heater 12 and a coffee bean husk collector 13 (hereinafter referred to as a husk collector) are provided in the body portion 6. The blower 11 has a fan provided therein, and feeds air of a predetermined pressure to the heater 12. The heater 12 is a nichrome coil-type heater and heats the air fed from the blower 11 up to a suitable temperature for roasting. The blower 11 and the heater 12 are connected to a control circuit 14 which controls all electrical components of the coffee maker 1. In FIG. 2, the control circuit 14 is shown outside the coffee maker body 1a but actually is provided within the coffee maker 1 in a vicinity of control dials 15 and 16 shown in FIG. 1. When the blower 11 and the heater 12 are both operated by the control circuit 14, a hot air flow is fed, and when only the blower 11 is operated an unheated air flow is fed.

An air supply pipe 17 and a suction pipe 18 are provided in the column portion 7. The air supply pipe 17 and the suction pipe 18 both have a heat resistant construction. A lower end of the air supply pipe 17 is connected with the heater 12, and a lower end of the suction pipe 18 is connected with the husk collector 13. On the other hand, upper ends of the air supply pipe 17 and the suction pipe 18 are connected to the head portion 8. Further, a filter 13a is provided so as to cover an air discharge hole (not shown) located on a side wall of the husk collector 13.

Figure 3:
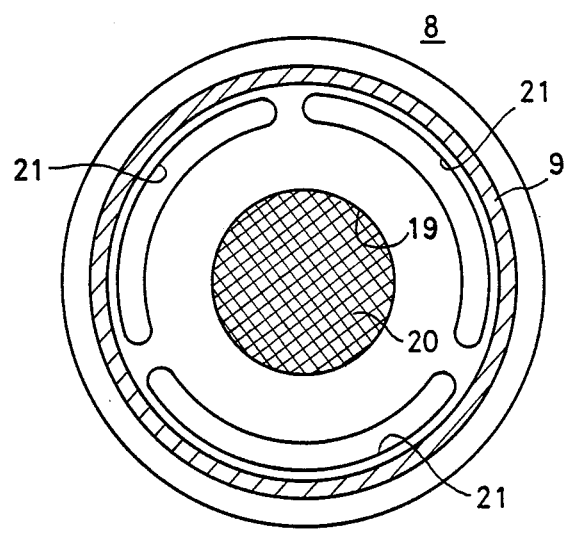
FIG. 3 is a sectional view taken along a line A—A in FIG. 2 for describing a head portion of the roasting portion.

A cross-sectional view taken along a line A—A in FIG. 2 is shown in FIG. 3. In FIG. 3, an air supply hole 19 is provided at a central position of the head portion 8. A filter 20 constituted by a mesh which prevents a thin outer layer (hereinafter referred to as a husk) of the coffee beans from passing therethrough as is described later is provided over the air supply hole 19. Further, suction holes 21 into which the husks of the coffee beans enter are formed at a circumferential portion outside of the air supply hole 19. The air supply hole 19 connects with the air supply pipe 17, and the suction hole 21 connects with the suction pipe 18. Further, a hatched portion in FIG. 3 denotes a roasting container 9. The roasting container 9 is rotatably attached in an air-tight state onto the head portion 8. As will be described later, the roasting container 9 has a construction such that when the raw coffee beans are to be loaded into the roasting container 9, the roasting container 9 can be detached from the head portion 8.

The roasting container 9 comprises a heat-resistant glass cylinder, and a lower end thereof is rotatably mounted on the base portion 10.

A motor 22 and an opening and closing mechanism 23 for opening and closing a pathway of the transfer portion 4 and which constitutes a portion of the transfer portion 4 are provided in the base portion 10. The opening and closing mechanism is one type of a gate mechanism and for example comprises a rotatable disc with one or a plurality of holes and a stationary disc with one or a plurality of holes. When the rotatable disc is rotated so that the one or plurality of holes thereof coincide with the respective one or plurality of holes of the stationary disc the pathway of the transfer portion 4 is opened, and when the one or plurality of holes for each of the rotatable and stationary discs do not coincide the pathway is closed. The motor 22 rotates the roasting container 9 which is rotatably mounted on the base 10 as aforementioned. The motor 22 is also connected to the control circuit 14. Also, the opening and closing mechanism 23 is connected to the control circuit 14. The opening and closing mechanism 23 closes the pathway of the transfer portion 4 when the coffee beans are being roasted and thus closes the lower end of the roasting container 9, and opens the pathway after the roasting has been completed and thus opens the lower end of the roasting container 9. Thus, the opening and closing mechanism 23 is constructed so as to enable the roasted coffee beans to feed out from the roasting container 9.

Further, in FIG. 2 a roasting container cover 24 is provided in order to prevent accidental contact of the user with the roasting container 9 which reaches a high temperature during roasting. The roasting container cover 24 is constructed so as to be rotatable around a pin 24a. Also, a tank 25 is used for containing water used for making the coffee. A heater 26 for boiling the water in the tank 25 is provided at a lower portion of the tank 25. Hot water boiled in the tank 25 is supplied to the extracting portion 5 through a pipe 27 which passes through a top cover 1b of the coffee maker 1.

Figure 4:
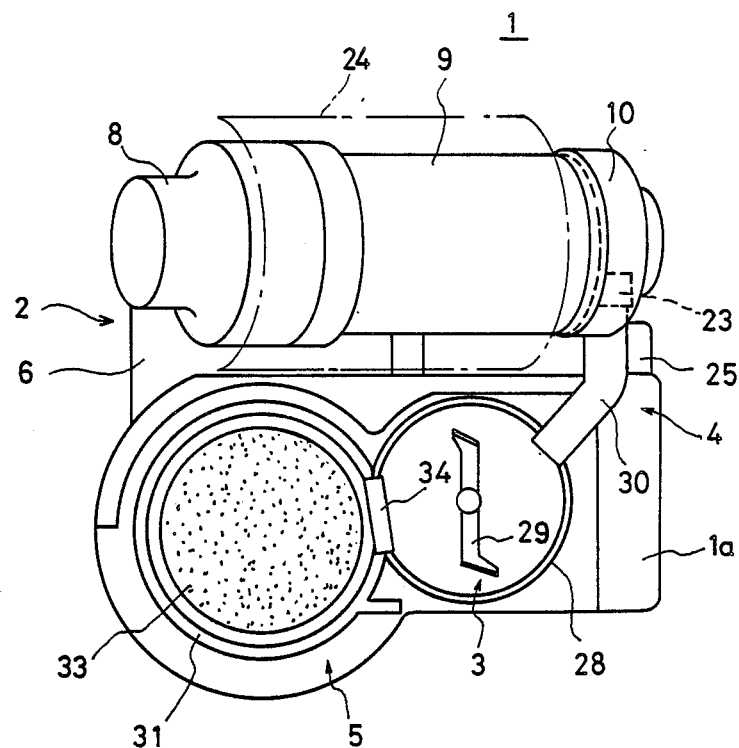
FIG. 4 is a plan view of the coffee maker in a state where a top cover thereof is removed.

Next, a description is given on the grinding portion 3 with reference to FIGS. 1 and 4. FIG. 4 shows a state where the top cover 1b is removed. The grinding portion 3 generally comprises a grinder container 28 and a cutter 29 provided in the grinder container 28. The grinding portion 3 is loaded with the roasted coffee beans and grinds the roasted coffee beans by rotation of the cutter 29 by a motor which is not shown and which is connected to the control circuit 14.

The transfer portion 4 is connected between the grinding portion 3 and the roasting portion 2. The transfer portion 4 comprises the opening and closing mechanism 23 and a transfer pipe 30. The transfer pipe 30 is connected at one end to the opening and closing mechanism 23 and is connected at another end to a top portion of the grinder container 28. The coffee beans roasted in the roasting portion 2 are transferred to the grinding portion 3 through the transfer portion 4.

The extracting portion 5 comprises a dripper 31 and a pot 32. A coffee extraction filter 33 is provided on a bottom surface of the dripper 31 and is indicated by a dotted portion in FIG. 4. The hot water of the tank 25 boiled by the heater 26 is poured onto the coffee extraction filter 33 from an upper portion of the dripper 31 through the pipe 27.

The grinding portion 3 is disposed in a position such that a bottom surface thereof is higher than that of the extracting portion 5. Further, the grinder container 28 and a portion of the dripper 31 communicate through a filter 34. The filter 34 is formed by a plurality of holes having a predetermined size such that only the roasted coffee beans which have been ground to a size suitable for extraction of the coffee therefrom are able to pass through. Accordingly, when the roasted coffee beans have been ground below a predetermined grain size in the grinding portion 3, the ground coffee beans which are subjected to a centrifugal force due to rotation of the grinding cutter 29 pass through the filter 34 and are collected in the dripper 31. Therefore, the transfer of the ground coffee beans from the grinding portion 3 to the extracting portion 5 is performed together with the grinding of the coffee beans.

Next, a description is given on a sequence of steps by which the coffee is made in the coffee maker 1 having the above described construction.

Figure 5:
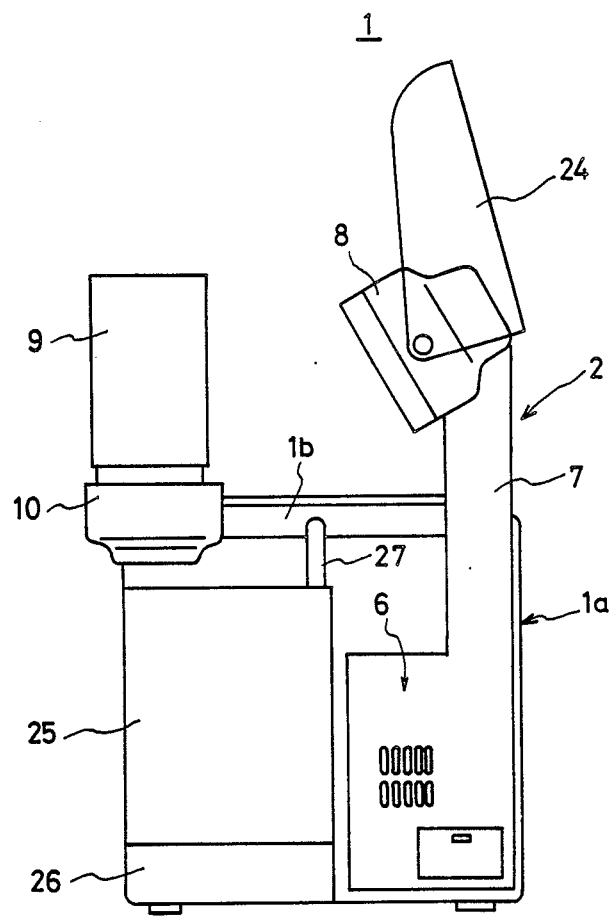
FIG. 5 is a view showing the coffee maker in a state for loading raw coffee beans into a roasting container.

The coffee maker 1 of the present invention is characterized by making coffee from raw coffee beans. The raw coffee beans are loaded into the roasting container 9 of the roasting portion 2. In order to load the raw coffee beans into the roasting container 9, as shown in FIG. 5, the roasting container cover 24 is raised and the roasting container 9 is rotated to an upright position. The roasting container 9 is constructed so as to be rotatable around the transfer pipe 30 which acts as a pivot for supporting rotation. In this state, the raw coffee beans are loaded into the roasting container 9. At this time, because the roasting container 9 is in the upright position, the raw coffee beans can be easily loaded therein.

Next, the roasting container 9 is set into a position shown in FIG. 2. Thereafter, the control dials 15 and 16 are adjusted so as to select the grain size of the ground coffee beans and the concentration of the coffee, and the operation of the coffee maker 1 is started. When the coffee maker 1 starts operating, the control circuit 14 drives the blower 11, the heater 12, the motor 22 and the heater 26. As a result, hot air flow generated by the blower 11 and the heater 12 passes through the air supply pipe 17 and is discharged into the roasting container 9 from the air supply holes 19 of the head portion 8. Due to the discharge of the hot air flow the raw coffee beans are roasted. Also, during this time the roasting container 9 is revolved by the motor 22.

On the other hand, because the end of the roasting portion 9 mounted on the base portion 10 is closed, the hot air flow discharged from the air supply holes 19 flows in the roasting container 9 as shown in FIG. 2. On the surface of the raw coffee beans there is a husk, and it is known that if the coffee beans are roasted while the husk still remains thereon, when making the coffee from these coffee beans there is a deterioration in the flavour and aroma of the coffee. However, in the present invention, because the hot air flow is used for the roasting, the husk on the surface of the coffee beans is completely separated from the coffee beans. The separated husk is light in weight and therefore drifts with the flow of the hot air.

As described previously, the suction holes 21 are provided in the head portion 8. The suction holes 21 are connected to the husk collector 13 through the suction pipe 18. The hot air flows so as to enter the suction holes 21, flow through the suction pipe 18 into the husk collector 13, and is discharged from the husk collector 13 to the external atmosphere through the filter 13a. At this time, the husks which have entered the suction holes 21 together with the hot air flow are accumulated in the husk collector 13 as the husks are prevented from being discharged to the external atmosphere by the filter 13a. Further, at this time, because the filter 20 is provided in the air supply hole 19, the husks do not enter the air supply hole 19.

After the hot air has been supplied for a predetermined time period to the roasting portion 2 and the roasting of the coffee has been completed, the heater 12 is turned off by a timer provided in the control circuit 14. On account of this, only unheated air is blown into the roasting container.

When the coffee beans have cooled down to such a degree that the coffee beans can be transferred to the grinding portion 3 without any problems caused by a high temperature thereof, the control circuit 14 supplies a signal to the opening and closing mechanism 23 so as to open the pathway of the transferring portion 4 between the roasting container 9 and the grinding portion 3. The transfer pipe 30 shown in FIGS. 1 and 4 is inclined in a downwards direction from the roasting portion 2 to the grinding portion 3, and thus the roasted coffee beans can be loaded into the grinding portion by gravitational force.

When the roasted coffee beans have all been loaded into the grinding container 28, the cutter 29 rotates responsive to a signal from the control circuit 14 and thus grinds the roasted coffee beans. As described before, due to the centrifugal force accompanying the rotation of the cutter 29 the coffee beans which have been ground to the predetermined size pass through the filter 34 and are transferred to the dripper 31. Next, when all of the coffee beans have been ground and transferred into the dripper 31, the control circuit 14 opens a valve (not shown) provided in the pipe 27 so that the hot water from the tank 25 boiled by the heater 26 drips out of the pipe 27 from the upper portion of the dripper 31 onto and through the extraction filter 33. Thus the coffee is extracted into the pot 32.

Therefore the coffee maker 1 roasts the raw coffee beans, and immediately thereafter grinds the roasted coffee beans and extracts the coffee from the ground coffee beans. As a result, it is possible to make the coffee having a high flavour and aroma. In addition, because it is possible to remove the husk which deteriorates the flavour and aroma of the coffee while the coffee beans are being roasted, the flavour and aroma of the coffee is further improved.

Further, in the present embodiment a description has been given on the coffee maker 1 which employs the drip method. However it is of course possible for the present invention to be applied to a coffee maker employing other methods such as the syphon method.

Further, in the present embodiment, the heater 12 for performing the roasting and the heater 26 for boiling the water in the tank 25 are separately provided. However, it is possible for the two heaters 12 and 26 to be combined into a single unit. In this manner, the construction of the coffee maker can be simplified.

Furthermore, in the present embodiment the roasting container 9 is disposed so as to rest in an inclined state on a side portion of the coffee maker body 1a. However, the present invention is not limited to the present embodiment and the roasting container 9 may be disposed in a variety of positions. For example, the roasting container 9 may be disposed in a vertical direction.

Furthermore, in the present embodiment, in order to transfer the roasted coffee beans from the roasting portion 2 to the grinding portion 3 through the transfer portion 4, the transfer pipe 30 in an inclined state is used. However, the present invention is not limited to the present embodiment. For example, a construction may be employed in which a spiral projection for stirring is provided along the inside surface of the roasting container 9 so that depending on the direction of rotation selected for the roasting container 9, the coffee beans are stirred during roasting, and when the roasted coffee beans are to be transferred to the grinding portion 3, the roasted coffee beans are forcibly transferred in the direction of the grinding portion 3 by the rotation of the roasting container in the opposite direction to that at the time of roasting. Further, as another alternative for transferring the roasted coffee beans to the grinding portion 3, a construction may be employed in which the coffee beans are blown in the direction of the grinding portion 3 by the flow of air from the blower 11.

According to the above described constructions of the coffee maker, immediately after the raw coffee beans are roasted, the roasted coffee beans are ground and the coffee is extracted therefrom. Because of this it is possible to make the coffee having an excellent flavour and aroma. Further, the series of operations of making the coffee by roasting the raw coffee beans, grinding the roasted coffee beans, and extracting the coffee from the ground coffee beans can be performed by full automation in a single apparatus. Therefore, it is possible to obtain the coffee having an excellent flavour and aroma with extreme ease. Furthermore, because the coffee is made from the raw coffee beans, in contrast to the conventional case, it is possible to keep the coffee beans in the raw state before roasting for a long time period without deterioration in the flavour and aroma of the coffee, and on the contrary, by keeping the raw coffee beans for a long time period, an improvement in the flavour and aroma of the coffee is obtained.

What is claimed is:

1. A fully automatic coffee maker comprising a roasting portion which heats coffee beans of the raw state by a heater so as to roast said coffee beans, a grinding portion which grinds coffee beans which have been roasted, said grinding portion being disposed at a height lower than a height of said roasting portion, a transfer portion which is connected between said roasting portion and said grinding portion and which after the roasting of the coffee beans by said roasting portion is completed automatically transfers the coffee beans which have been roasted from said roasting portion to said grinding portion, and an extracting portion into which the coffee beans which have been ground in said grinding portion are loaded and which extracts the coffee from the coffee beans loaded therein.

2. A fully automatic coffee maker as claimed in claim 1, wherein said roasting portion roasts the coffee beans of the raw state by a hot air flow.

3. A fully automatic coffee maker comprising a roasting portion which heats coffee beans of the raw state by a heater so as to roast said coffee beans, a grinding portion which grinds coffee beans which have been roasted, a transfer portion which is connected between said roasting portion and said grinding portion and which after the roasting of the coffee beans by said roasting portion is completed automatically transfers the coffee beans which have been roasted from said roasting portion to said grinding portion, and an extracting portion into which the coffee beans which have been ground in said grinding portion are loaded and which extracts the coffee from the coffee beans loaded therein, said roasting portion comprising a body portion, a column portion, a head portion, a roasting container, and a base portion; said body portion being provided with a blower, the heater, and a husk collecting portion; said column portion having an air supply pipe being connected to an air hole which accommodates a filter; said suction pipe being connected to a suction hole; and wherein said roasting container is mounted in a rotatable state on said base portion, and said base portion accommodates a motor which rotates said roasting container.

4. A fully automatic coffee maker as claimed in claim 3, wherein said heater provided in said body portion is a coil-type heater made of nichrome.

5. A fully automatic coffee maker as claimed in claim 3, wherein said body portion has a construction in which heated air or unheated air can be selectively supplied to said roasting container because said heater is operated independently from the operation of said blower.

6. A fully automatic coffee maker as claimed in claim 3, wherein said roasting container is made of a heat-resistant glass.

7. A fully automatic coffee maker as claimed in claim 3, wherein said roasting container is detachable from said head portion.

8. A fully automatic coffee maker as claimed in claim 3, wherein a filter is provided on said husk collecting portion so that husks of the coffee beans which are removed from the coffee beans during roasting are transferred into said suction hole of said head portion and through said suction pipe, and are collected in said husk collecting portion and are prevented from being transferred out from said husk collecting portion by said filter.

9. An automatic coffee maker comprising a roasting portion which heats coffee beans of the raw state by a heater so as to roast said coffee beans, a grinding portion which grinds coffee beans which have been roasted, a transfer portion which is connected between said roasting portion and said grinding portion and which after the roasting of the coffee beans by said roasting portion is completed automatically transfers the coffee beans which have been roasted from said roasting portion to said grinding portion, and an extracting portion into which the coffee beans which have been ground in said grinding portion are loaded and which extracts the coffee from the coffee beans loaded therein, said transfer portion comprising an opening and closing mechanism and a transfer pipe; said opening and closing mechanism being provided in said base portion, and closes a pathway from said roasting container when the coffee beans are being roasted, and opens the pathway from said roasting container after the roasting has been completed; and said transfer pipe is connected between said opening and closing mechanism and said grinding portion, and transfers the coffee beans which have been roasted and have entered therein to said grinding portion.

10. A fully automatic coffee grinding as claimed in claim 9, wherein said base portion is rotatable around said transfer pipe which acts as a pivot for supporting rotation.

11. A fully automatic coffee maker as claimed in claim 9, wherein said transfer pipe is inclined in a downwards direction from said roasting portion to said grinding portion.

12. A fully automatic coffee maker as claimed in claim 3, wherein a spiral projection for stirring is provided along an inside surface of said roasting container so that depending on the direction of rotation selected for said roasting container, the coffee beans are stirred during roasting, and when the roasted coffee beans are to be transferred to said grinding portion, the roasted coffee beans are forcibly transferred in a direction towards said grinding portion by the rotation of said roasting container in an opposite direction to that at the time of roasting.

* * * * *

UNITED STATES PATENT AND TRADEMARK OFFICE
CERTIFICATE OF CORRECTION

PATENT NO. : 4,895,308

DATED : January 23, 1990

INVENTOR(S) : Mutuo Tanaka

It is certified that error appears in the above-identified patent and that said Letters Patent is hereby corrected as shown below:

| | |
|---|---|
| Column 7, line 5 | after "therein" insert ---, said roasting portion comprising a body portion, a column portion, a head portion, a roasting container, and a base portion; said body portion being provided with a blower, the heater, and a husk collecting portion; said column portion having an air supply pipe; said air supply pipe being connected to an air hole which is located in said head portion, and to said husk collecting portion; and wherein said roasting container is mounted in a rotatable state on said base portion, and said base portion accommodates a motor which rotates said roasting container.--- |
| Column 7, line 26 | after "pipe" insert ---and a suction pipe accommodated therein; said air supply pipe--- |
| Column 8, line 7 | delete "comprising a roasting" and substitute therefor --- as claimed in claim 3, wherein--- |
| Column 8 | delete lines 8-19 |
| Column 8, line 20 | delete "therein," |

UNITED STATES PATENT AND TRADEMARK OFFICE
CERTIFICATE OF CORRECTION

PATENT NO. : 4,895,308

DATED : January 23, 1990

INVENTOR(S) : Mutuo Tanaka

It is certified that error appears in the above-identified patent and that said Letters Patent is hereby corrected as shown below:

Column 8, line 20    delete "comprising" and substitute therefor --comprises--

Signed and Sealed this

Thirteenth Day of August, 1991

Attest:

HARRY F. MANBECK, JR.

*Attesting Officer*      *Commissioner of Patents and Trademarks*